United States Patent
Moisel et al.

(10) Patent No.: US 7,151,439 B2
(45) Date of Patent: Dec. 19, 2006

(54) DEVICE FOR IMPROVING THE VISIBILITY CONDITIONS IN A MOTOR VEHICLE

(75) Inventors: Joerg Moisel, Neu-Ulm (DE); Michael Holz, Senden (DE)

(73) Assignee: DaimlerChrysler AG, Stuttgart (DE)

( * ) Notice: Subject to any disclaimer, the term of this patent is extended or adjusted under 35 U.S.C. 154(b) by 191 days.

(21) Appl. No.: 10/957,794

(22) Filed: Oct. 4, 2004

(65) Prior Publication Data
US 2005/0073581 A1 Apr. 7, 2005

(30) Foreign Application Priority Data
Oct. 2, 2003 (DE) ................ 103 46 482

(51) Int. Cl.
*B60Q 1/00* (2006.01)
*H04N 7/18* (2006.01)

(52) U.S. Cl. ............ 340/425.5; 348/148; 348/164

(58) Field of Classification Search ........ 340/425.5, 340/426.6, 441, 433; 348/148, 164; 250/330, 250/334
See application file for complete search history.

(56) References Cited

U.S. PATENT DOCUMENTS

| | | | | |
|---|---|---|---|---|
| 5,191,312 A | * | 3/1993 | Altmann et al. | 340/441 |
| 5,404,443 A | * | 4/1995 | Hirata | 725/75 |
| 5,793,420 A | * | 8/1998 | Schmidt | 348/148 |
| 6,144,296 A | * | 11/2000 | Ishida et al. | 340/461 |
| 6,327,522 B1 | * | 12/2001 | Kojima et al. | 701/1 |
| 6,693,518 B1 | * | 2/2004 | Kumata et al. | 340/435 |
| 7,015,828 B1 | * | 3/2006 | Ueminami et al. | 340/937 |
| 2001/0040534 A1 | | 11/2001 | Ohkawara et al. | |

FOREIGN PATENT DOCUMENTS

DE 39 37 416 A1 5/1991

* cited by examiner

*Primary Examiner*—Donnie L. Crosland
(74) *Attorney, Agent, or Firm*—Akerman Senterfitt; Yonghong Chen; Stephan Pendorf

(57) ABSTRACT

A device for improving the visibility conditions in a motor vehicle has a radiation source for infrared radiation for irradiating the surroundings of the vehicle, an infrared-sensitive camera for taking images of at least part of the irradiated surroundings, a display unit for displaying collected image data, and a control unit for controlling the device. The control unit is configured in such a way that the display is switched off after a predefined time period t has expired. This device ensures very safe operation for the user.

11 Claims, 1 Drawing Sheet

DEVICE FOR IMPROVING THE VISIBILITY CONDITIONS IN A MOTOR VEHICLE

BACKGROUND OF THE INVENTION

1. Field of Invention

The invention relates to a device for improving the visibility in a motor vehicle.

2. Related Art of the Invention

DE 40 32 927 C2 discloses a device for improving the visibility in a motor vehicle having a radiation source for infrared radiation for irradiating the surroundings of the vehicle, and having an infrared-sensitive camera which takes images of the irradiated field of vision of the driver and makes available the collected image data to the driver by means of a display device which is embodied as a head-up display and in which the image data is visually superimposed as a virtual image on the external landscape. By means of this device, the driver can see considerably better at night or in bad weather conditions, in particular when he is dazzled by oncoming vehicles. As a result of the use of infrared radiation, the driver is, in contrast, not dazzled by the oncoming traffic. Such devices of this type are called night vision systems.

By virtue of the improved visibility, the vehicle driver may be tempted to look exclusively at the display and not to observe the surroundings directly any more, which can lead to misinterpretations. In particular there is the risk of the field of vision being overestimated and of driving too quickly owing to the supposedly better visibility.

SUMMARY OF THE INVENTION

The invention is based on the object of specifying a device for improving the visibility conditions in a motor vehicle which reduces these disadvantages and as a result improves traffic safety.

This object is achieved by means of a device for improving the visibility conditions in a motor vehicle having the features of claim 1.

Advantageous developments of the device are the subject matter of the subclaims.

The device according to the invention for improving the visibility conditions in a motor vehicle ensures that the display is switched off under the control of the control unit after the expiry of a predefined time period t, and the representation of the collected image data is thus interrupted. As a result of this targeted interruption of the representation of images it is ensured that the user of the vehicle cannot concentrate continuously and thus exclusively on the display and have only the display in his field of vision and steer the vehicle only on the basis of the image data. This therefore ensures that the driver looks away from the display at the latest when the time period t expires and considers the real surroundings of the vehicle and again uses this information to make the decisions in order to drive the vehicle. As a result of this form of operation of the device it is therefore ensured that the respectively useful and positive advantages of the collected information directly from the surroundings and from the display, respectively, complement one another without significant associated disadvantages.

Furthermore, it is possible, since the mode of operation of the device forces the driver to stop looking at the representation of the surroundings on the display, to reduce the risk of tending to overestimate the visibility conditions and thus the risk of driving too fast since the vehicle driver cannot rely only on the improved visibility which is provided by the device according to the invention. Overall, these aspects lead to an improvement in the safety of the vehicle driver or the driver and thus also of the traffic as a whole and the persons involved in it.

The time period t is preferably selected in the range of less than one minute, in particular in a range between 2 and 30 seconds. It has also proven effective to select a time period t which is longer than a minute or in the region of several minutes. These time periods ensure that the vehicle driver is provided with sufficient reliable information by the device according to the invention which permits improved visibility at night or in bad weather. This improved visibility reduces the risk of accidents, the selective termination of the representation of image data on the display ensuring that the negative effects of this improved representation of the surroundings on the basis of the infrared radiation which is reflected by the surroundings and which is sensed via the infrared-sensitive camera and represented on the display do not occur, or occur only to a limited degree.

It has proven particularly effective to store the predefined time period permanently in the device and/or for it to be re-stored with modified time periods as part of maintenance operations by the specialist personnel department. Furthermore, it is conceivable for the predefined time to be able to be changed by the user and for the modified time period then to be able to be used as the basis of the switching off of the representation on the display. This device proves very flexible and very user-friendly. Nevertheless it has proven effective not to give the vehicle driver a complete control over the predefined time period t so that he does not select a maximum time period t which is too long as a result of which the positive inventive effect is dramatically restricted. Furthermore, it has proven particularly effective to change the time period t in accordance with the situation. For example, it has proven effective in the case of very bendy sections of road or stretches of road with a layout which is unfavourable for visibility to select a short time period t, which is done by the control unit. This device ensures that a very effective time period t is selected, which ensures a considerable increase in safety depending on the situation.

According to one preferred embodiment of the device, the control unit is embodied in such a way that the camera can be switched off in addition to the display. Here, the camera is switched off after a predefined time period $t_K$. The time period $t_K$ can be of equal length to the time period t or longer than it. This ensures that the device operates efficiently and reliably without the operational capability of the device being restricted. Making a selection of the time period $t_K$ which is only slightly longer than the time period t ensures that the camera is not switched off before the display and that in addition the camera as a large energy consumer, which can only be re-activated very slowly, is not switched off too early with the display or directly after it. Alternatively or additionally to the camera, the radiation source is also switched on and off under the control of the control unit. In this case, the control unit ensures that the time period t and the time period $t_K$ begin to run starting from the same switch-on time.

According to another preferred embodiment of the invention, in addition to the on and off switch for the device, an additional switch is provided for switching on the display and/or the camera. This additional switch permits the active, conscious switching on of the representation of images on the display after the display or the camera has been switched off after the time periods t and $t_K$ have expired. This ensures that the vehicle driver can completely activate the device as required by activating the additional switch, and can thus obtain the advantage of improved visibility. It has proven particularly effective here to implement the additional switch in the region of the steering wheel in particular in the form of a headlamp flasher or a rocker on the steering wheel. The arrangement of the additional switch in the region of the steering wheel makes it possible to activate the switch without the driver having to completely take one or both hands off the steering wheel. This leads to very safe handling of the device and thus to an increase in road safety. The use of the headlamp flasher as an additional switch for the device has proven particularly effective, ensuring that, by activating the headlamp flasher, not only the headlamp flashing function but also the display and the camera are re-activated. This leads to a situation in which the surroundings of the vehicle which are irradiated by the infrared radiation source are at least partially sensed by the camera and the collected image data can be displayed on the display. When switching on occurs, the time which has passed since the switching on is determined in the control unit in order to compare this time with the time period t or $t_K$ in order then to switch off the display, the radiation source or the camera when these time periods are reached.

It has proven particularly effective to restrict the representation of the collected image data by the display essentially to the time period when a switch is activated, and accordingly to select a very short time period t, in an extreme case equal to 0 seconds. This ensures that a vehicle driver makes use of the device according to the invention when required, for example when dazzled by oncoming traffic at night, and otherwise concentrates on sensing the surroundings directly, which significantly reduces the risk of overestimating a situation.

It has proven particularly advantageous to make the switching off of the display, that has to say the termination of the representation of images, sudden, that is to say abrupt. This has the advantage that a very simple control of the device, which is not very susceptible to faults, is sufficient to obtain this positive effect according to the invention for increasing road safety.

Furthermore, according to another embodiment of the invention it has proven effective to make the switching-off process gradual so that the reproduction of images does not change abruptly but rather gradually, over a certain time period, from the complete representation of image data to the switched-off state without representation of image data. In this context, this gradual switching off can be brought about, for example, by restricting the brightness values or contrast values of the representation of images or of the display in such a way that an increasingly low brightness range or contrast range is continuously made available. This reduction of the brightness range or contrast range is continued until these ranges have dropped to zero and thus the display is switched off. Alternatively, it has also proven effective for this purpose to disassociate the image data by means of artificial noise and to make the disassociation become stronger and stronger, which is brought about by increasing the proportion of noise until the image data can virtually no longer be perceived. This state corresponds to the switched-off display since this display is no longer suitable for displaying the image data to be displayed which relates to the sensed surroundings which are irradiated by infrared light. This switching-off process is preferably implemented as a linearly extending gradual transition, which is made possible by means of a control which is not too complicated. Alternatively, nonlinear processes are also conceivable. This embodiment of the device according to the invention with a gradual switching-off process ensures that the user receives information about the imminent final termination of the representation of images before the final switching off of the representation of images on the display, and is thus not unpleasantly surprised. This has a positive effect on the reduction of the risk of accidents.

It has also proven particularly effective to signal the switching off to the vehicle driver before the switching off is carried out. This signalling is carried out, for example, by means of a visual representation on the display, alternatively or additionally by means of haptic signalling, for example by vibrating the steering wheel or by means of an audible signal, for example by the sounding of a short tone. This advance information before the switching off is carried out ensures that the driver is prewarned to a particular degree before the switching off is carried out. This leads to an improvement in road safety. Audible warning signals have proven particularly effective since they can also be perceived without visual contact with the display, for example during the direct consideration of the surroundings of the vehicle, and can thus be perceived by the vehicle driver at regular intervals without interruptions or with only short interruptions in such a way that he is not surprised by the switching off of the display or the representation of images on the display.

It has proven effective to represent the residual running time on the display as a particularly preferred way of signalling the imminent switching off so that the vehicle driver is always informed about the remaining time until the camera or the display is switched off. This representation is preferably made in seconds or else in the form of a bar diagram. In particular a bar diagram representation proves a very intuitive form of representation which is easy to comprehend and which is sufficiently reliable in providing the driver with a warning while simultaneously not distracting him very much. This form of representation of the signalling in the form of the residual running time, in particular in the form of the bar representation, provides a very reliable and informative warning about the switching off of the representation on the display, which leads to very reliable operation of the device and thus to a considerable increase in road safety.

According to one particularly preferred embodiment of the device, the control unit is embodied in such a way that the current vehicle velocity can be fed to it and it controls the switching off in such a way that the display or the camera is switched off when the vehicle velocity V exceeds a predefined maximum velocity. In this case, it is ensured that the vehicle driver cannot rely on the subjective impression of particularly good, overestimated visibility and correspondingly selects his vehicle velocity V inappropriately high in accordance with his misinterpreted field of vision. As a result of the velocity-dependent switching off when a maximum velocity $V_{max}$ is exceeded, it is ensured that the vehicle driver is forced to rely on the direct sensing of the surroundings of the vehicle, i.e. for example to rely on the usual sensing of the surroundings of the vehicle at night or when visibility is poor and not to use the improved visibility by means of the device which can be made available to him via the display. As a result of this switching off he is forced to consider his velocity at regular intervals since the improved visibility is no longer available to him and correspondingly he must select his driving velocity in accordance with the actual visibility in the visible range, that is to say without support by infrared radiation, and correspondingly must make a reduced selection. This leads to a situation in which the driver then reduces his driving velocity regularly on the basis of the poorer visibility, which leads to a situation in which the device can be fully actuated again when the velocity drops below a corresponding velocity limit and the improved visibility of the surroundings of the vehicle which is acquired by means of the device can be made available to the driver.

BRIEF DESCRIPTION OF THE DRAWING

The invention will be explained in more detail below with reference to an exemplary implementation of the device according to the invention for improving the visibility conditions in a motor vehicle. The invention is not restricted to this embodiment.

DETAILED DESCRIPTION OF THE INVENTION

Figure 1:
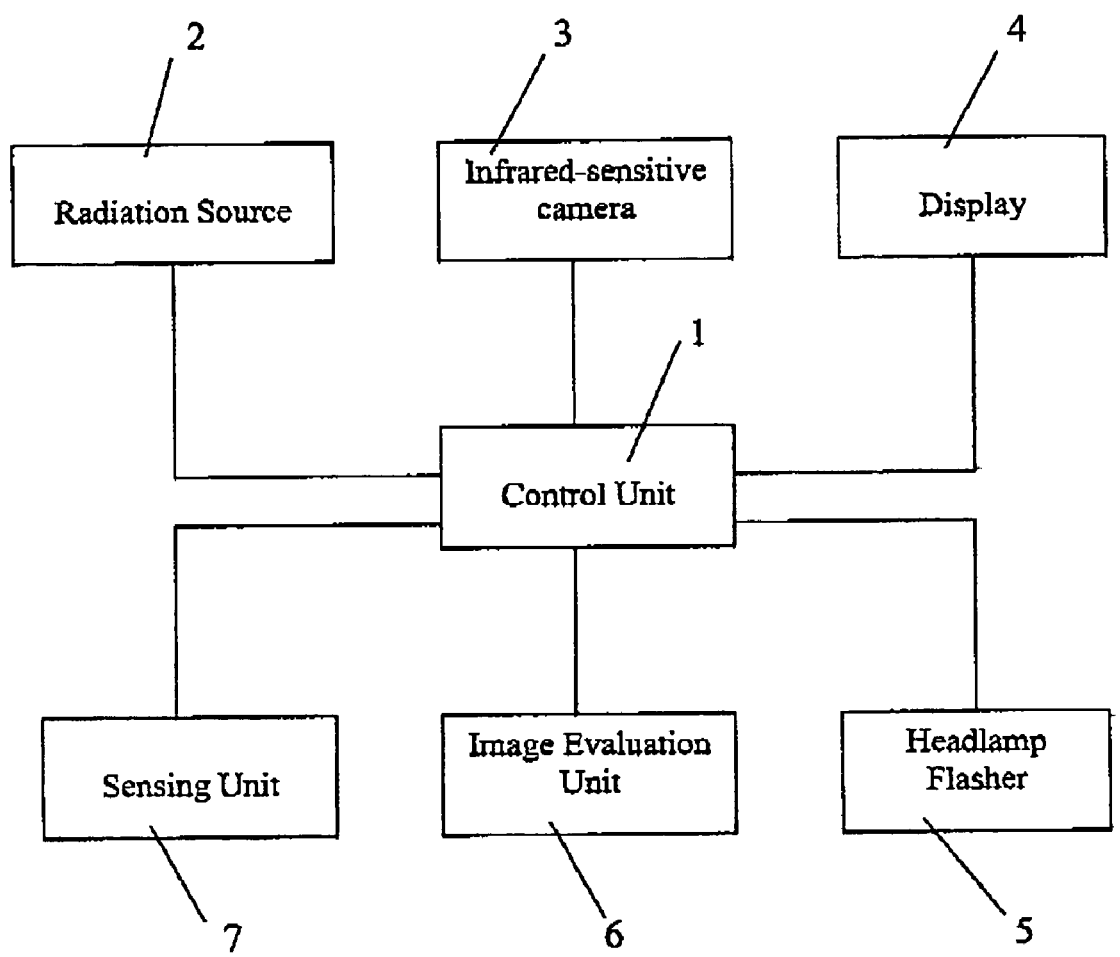
FIG. 1 shows a schematic design of the device according to the invention for improving the visibility conditions in a motor vehicle.

This device exhibits a radiation source 2 for infrared radiation which irradiates infrared radiation with a wavelength of approximately 800 nm. The radiation source 2 is implemented as an infrared laser. This radiation source 2 is arranged in the front region of the vehicle in the region of the headlights and irradiates the region in front of the vehicle. In addition, this device has an infrared-sensitive camera 3 which is arranged in the vehicle and is orientated in such a way that it senses at least part of the surroundings which are irradiated by the infrared radiation source 2, and feeds the collected image data to the display 4 via the control unit 1. By means of the display 4, the image data which is fed to it and collected by the camera 3 is displayed and thus made available to a vehicle driver. The control unit 1 controls the infrared radiation source 2, the camera 3 and the display 4 in this context.

The infrared radiation source 2 radiates infrared radiation here, which is reflected at least partially from the surroundings and collected by the infrared-sensitive camera 3 as reflected radiation and converted into image data. This image data is represented by the display 4 either directly or after a certain degree of image signal processing by means of the image evaluation unit 6. As a result, the image which is represented on the display 4 is an infrared representation of the surroundings of the vehicle. Since the infrared reflective properties and irradiation properties of the surroundings differ from the properties in the visible light range, the image represented will also differ from the direct view of the surroundings by the vehicle driver. By using the device it is possible to use these differences advantageously, which leads to improved visibility in particular at night, but also in bad weather conditions such as in the rain or in fog.

The control unit 1 controls the display 4 here in such a way that after a predefined time period t has expired the representation of images on the display 4 is terminated and the display 4 is thus switched off. It is not necessary to completely switch off the display 4; for the operational capability of the device according to the invention it is sufficient to merely terminate the representation of images. The switching off of the display 4 requires the vehicle driver to look away from the display 4 and to direct his gaze directly on to the surroundings of the vehicle again. This ensures that he cannot be dazzled by the improved visibility which is provided by the device according to the invention and, owing to the improved visibility, misinterprets his own capabilities, the vehicle or the external circumstances and, for example, drives too quickly or with an inappropriate velocity. Instead, the switching off of the display 4 causes him to turn his attention directly to the surroundings of the vehicle and to adapt his driving behavior in an orderly manner to the visibility conditions which are then available to him and to use again the improved visibility after the device or the representation of images of the display 4 has been switched on again, without automatically being subject to a misinterpretation of the situation. This effect has proven very advantageous and very acceptable. In addition to the switching off of the display 4 after a time period t, the control unit 1 also has the control function of switching off the camera 3 after a time period $t_K$ which is one minute longer than time period t, which is in the region of one minute or half a minute. This additional control function ensures very effective operation of the device, in which case, on the one hand, the operational capability of the device is maintained without restriction but, on the other hand, the consumption of energy of the device is markedly reduced. The consumption of energy of such a device is of particular significance in a vehicle since such a vehicle has a large number of electronic components of which a large number operate simultaneously and correspondingly consume a considerable amount of energy which the vehicle, with its autonomous energy supply, can make available only to a limited degree.

Furthermore, the control unit 1 is connected to the headlamp flasher 5 which is arranged as an additional switch in the region of the steering wheel. The actuation of the headlamp flasher switch causes the display 4 or the camera 3 to be actuated again and switched on again under the control of the control unit 1. As a result, the timing process is restarted and the display 4 or the camera 3 is kept operational until the time periods t and $t_K$ have passed and the display 4 or the camera 3 is switched off as a function thereof. As a result of this simple embodiment of an additional switch for switching on the display 4 or the camera 3, a very robust and safe and easy-to-handle device is provided which, on the one hand, makes available improved visibility for the vehicle driver, and on the other hand prevents undesired driving only in accordance with the display, and on the other hand permits actuation without significant difficulties. By using the headlamp flasher switch 5 it is possible for the driver to activate the display 4 or the camera 3 by actuating the headlamp flasher in parallel, without the driver having to release the steering wheel from his secure grip. This leads to very safe handling of the device and thus to an increase in road safety.

The control unit 1 is connected to an image evaluation unit 6 which carries out the termination of the representation of images, and thus the switching off of the display 4, in a gradual fashion. In this context, the collected image data is artificially degraded during the gradual switching off by adding noise components until only noise is represented on the display 4, and the display 4 can thus be switched off, as it were. As the noise increases, the image information which can be sensed, and thus the represented image data, becomes less useful for the vehicle driver, who is accordingly increasingly inclined to view and sense the surroundings of the vehicle directly. This gradual switching off ensures that the vehicle driver is forewarned of the imminent final switching off and is therefore not surprised by the final switching off. This has proven very positive for the vehicle driver.

Furthermore, a sensing unit 7 is provided which senses the vehicle velocity V and feeds it to the control unit 1. This control unit 1 compares the current vehicle velocity V, which has been sensed by the sensing unit 7, with a predefined maximum velocity $V_{max}$. If the current vehicle velocity V exceeds the maximum velocity $V_{max}$, the control unit 1 will switch off the display 4 in a corresponding way to the sequence of the time period t. In addition, the camera 3 is also switched off. When the velocity drops below the maximum velocity, the switched-off components are then activated again so that the image data which is collected by the camera 3 can be made available to the user again on the display 4.

The described device thus exhibits switching off of individual components 3, 4 as a function of the velocity V at which the vehicle is travelling or as a function of the operating time of the display 4 or of the camera 3. This embodiment of the device makes it possible to limit incorrect preconceptions of the vehicle driver with respect to the driving situation and thus to increase the road safety for the vehicle driver, the vehicle and the traffic as a whole.

The invention claimed is:

1. A device for improving the visibility conditions in a motor vehicle, comprising:
   a radiation source for infrared radiation for irradiating the surroundings of the vehicle,
   an infrared-sensitive camera for collecting radiation reflected from at least part of the irradiated surroundings and converting the radiation into image data,
   a display unit for displaying the image data, and
   a control unit for controlling the device,
   wherein the control unit has a switch for switching off the display after a predefined time period t has expired.

2. The device according to claim 1, wherein the switch, in addition to the display, switches off the camera and/or the radiation source after a predefined time period $t_k$.

3. The device according to claim 1, further comprising an additional switch for switching on the display after switching off occurs.

4. The device according to claim 3, wherein the additional switch is implemented in a region of the steering wheel, in particular by a headlamp flasher or a steering wheel rocker.

5. The device for according to claim 1, wherein the display is switched off suddenly.

6. The device according to claim 1, wherein the switching off of the display is gradual.

7. The device according to claim 1, wherein the control unit is configured in such a way that before the switching off takes place the control unit causes the switching off to be signaled.

8. The device according to claim 7, wherein a residual running time is displayed for the purpose of signaling.

9. The device according to claim 1, wherein the time period t lies in the minute range, in particular in the range of half a minute.

10. The device according to claim 1, wherein the time period t is adjustable.

11. The device according to claim 1, wherein the control unit is embodied in such a way that switching off occurs when a vehicle velocity v above a predefined maximum velocity $v_{max}$ is exceeded.

* * * * *